(12) United States Patent
Nakanishi et al.

(10) Patent No.: US 8,427,017 B2
(45) Date of Patent: Apr. 23, 2013

(54) SPLIT STATOR MEMBER AND METHOD OF MANUFACTURING THE SPLIT STATOR MEMBER

(75) Inventors: Koji Nakanishi, Konan (JP); Hideaki Takahashi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 211 days.

(21) Appl. No.: 12/921,299

(22) PCT Filed: Mar. 2, 2009

(86) PCT No.: PCT/JP2009/054359
§ 371 (c)(1),
(2), (4) Date: Sep. 7, 2010

(87) PCT Pub. No.: WO2009/113465
PCT Pub. Date: Sep. 17, 2009

(65) Prior Publication Data
US 2011/0012445 A1 Jan. 20, 2011

(30) Foreign Application Priority Data

Mar. 10, 2008 (JP) .................................. 2008-059790

(51) Int. Cl.
*H02K 3/32* (2006.01)
(52) U.S. Cl.
USPC ............................................... 310/43; 310/45
(58) Field of Classification Search .................... 310/43, 310/45, 216.065, 216.067, 216.109, 254.1
See application file for complete search history.

(56) References Cited

U.S. PATENT DOCUMENTS

| | | | |
|---|---|---|---|
| 5,698,243 A * | 12/1997 | Wakabayashi | 425/545 |
| 6,288,341 B1 * | 9/2001 | Tsunoda et al. | 174/137 B |
| 6,323,571 B1 | 11/2001 | Nakahara et al. | |
| 8,063,518 B2 * | 11/2011 | Asai | 310/43 |
| 2009/0173828 A1 * | 7/2009 | Oguri et al. | 244/132 |
| 2009/0174279 A1 * | 7/2009 | Sheaffer et al. | 310/201 |

FOREIGN PATENT DOCUMENTS

| | | |
|---|---|---|
| EP | 0 951 132 A | 10/1999 |
| GB | 1500727 A | 2/1978 |
| JP | 08-130843 A | 5/1996 |
| JP | 2003-284277 A | 10/2003 |
| JP | 2004-208446 A | 7/2004 |
| JP | 2005-065373 A | 3/2005 |
| JP | 2006-180698 A | 7/2006 |
| JP | 2007-215334 A | 8/2007 |
| JP | 2007-215335 A | 8/2007 |
| KR | 10-2005-0025584 A | 3/2005 |
| WO | 2004/008609 A2 | 1/2004 |
| WO | 2005/027306 A2 | 3/2005 |

* cited by examiner

*Primary Examiner* — Tran Nguyen
*Assistant Examiner* — Naishadh Desai
(74) *Attorney, Agent, or Firm* — Kenyon & Kenyon LLP

(57) ABSTRACT

A split stator is manufactured in such a manner that an adhesive is applied on a teeth part of a split core to form an adhesive layer, the split core is inserted in a lower die, a molten insulator material containing fibrous fillers is injected in the die, and an upper die is moved to form an insulator. In the insulator, the fibrous fillers are oriented in random directions, providing increased thermal conductivity.

10 Claims, 9 Drawing Sheets

FIG. 9　　　　　　　　　　　　　　　　　RELATED ART
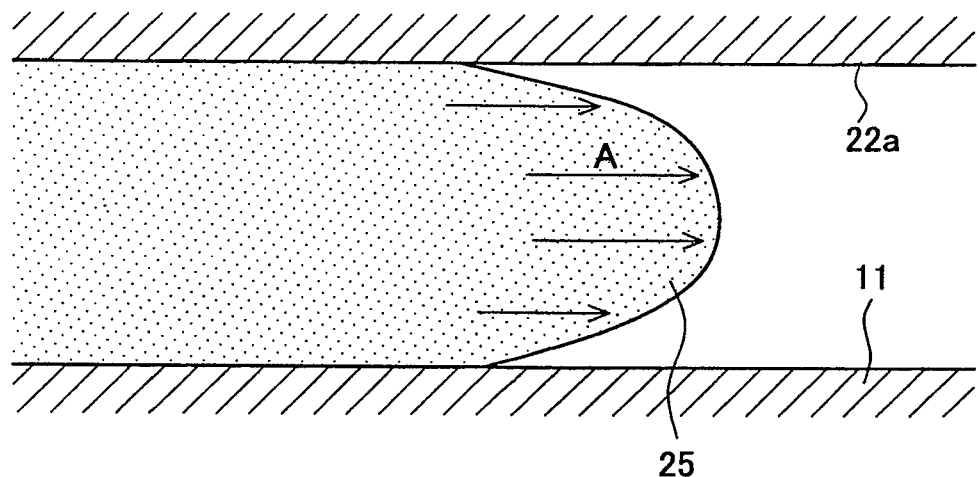
FIG. 10
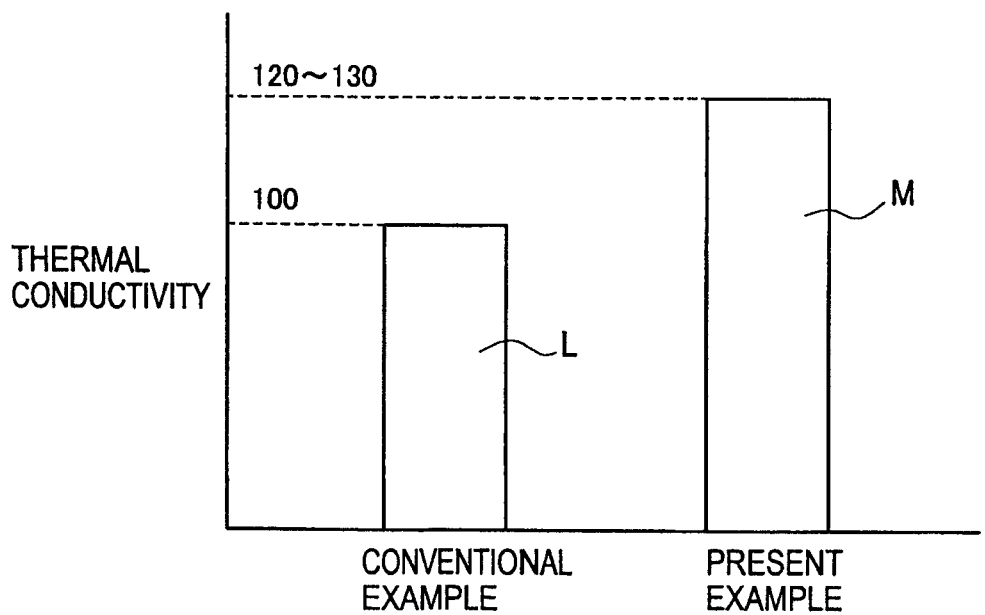

SPLIT STATOR MEMBER AND METHOD OF MANUFACTURING THE SPLIT STATOR MEMBER

This is a 371 national phase application of PCT/JP2009/054359 filed 2 Mar. 2009, claiming priority to Japanese Patent Application No. 2008-059790 filed 10 Mar. 2008, the contents of which are incorporated herein by reference.

TECHNICAL FIELD

The present invention relates to an easily manufacturable split stator for motor and a method of manufacturing the split stator.

BACKGROUND ART

Heretofore, there is a method of manufacturing a stator core by laminating steel sheets produced by press-punching and then the stator core mounted thereon with a coil is molded of resin by injection molding.

On the other hand, there is also another method of manufacturing a stator core by assembling a plurality of split cores on each of which a coil is mounted. In this case of using the split cores, they are assembled integrally by use of a shrink fitting ring.

JP2006-180698A discloses a method of manufacturing a split stator by molding resin on a split core. This publication discloses a technique of producing an insulator integral with the split core in such a way that a cavity for insulator is provided around a teeth part of the split core between the split core and a molding die, and then resin containing fibrous inorganic reinforcing materials is injected into the cavity.

SUMMARY OF INVENTION

Technical Problem

However, the technique disclosed in JP2006-180698A may cause the following problems. Specifically, the fibrous reinforcing materials are oriented in a resin flowing direction. Thus, the fibrous reinforcing materials are oriented so as to be laminated in a direction of thickness of the insulator, resulting in insufficient thermal conductivity of the insulator in its thickness direction.

Especially, in a motor to be used in a hybrid electric vehicle, the coil has a high space factor and is supplied with high voltage in use. Thus, the thermal conductivity of the insulator is an important issue.

The present invention has been made in view of the above circumstances and has an object to provide a split stator provided with an insulator having high thermal conductivity, and a method of manufacturing the split stator.

Solution to Problem (1) To achieve the above object, the present invention provides a split stator comprising: a split core having a teeth part; and an insulator formed on an outer periphery of the teeth part with an adhesive layer being interposed therebetween.
(2) In the split stator described in (1), preferably, the insulator is formed on the outer periphery of the teeth part by resin molding.
(3) In the split stator described in (2), preferably, the insulator is molded of a resin material containing a filler, and the filler has higher thermal conductivity than thermal conductivity of the resin material.
(4) In the split stator described in (3), preferably, the filler has a nonspherical shape.
(5) According to another aspect, the present invention provides a method of manufacturing a split stator including a split core, comprising the steps of: forming an insulator on an outer periphery of a teeth part of the split core after applying an adhesive on the outer periphery of the teeth part.
(6) In the split stator manufacturing method described in (5), preferably, the insulator is formed of a resin material on the outer periphery of the teeth part by resin molding.
(7) In the split stator manufacturing method described in (6), preferably, the resin material contains a filler, and the filler has higher thermal conductivity than thermal conductivity of the resin material.
(8) In the split stator manufacturing method described in (7), preferably, the filler has a nonspherical shape.
(9) In one of the split stator manufacturing methods described in (5) to (8), preferably, the adhesive is heated in advance before the insulator is formed.

Advantageous Effects of Invention

The above split stator and manufacturing method thereof according to the present invention can provide the following operations and advantages.

In the present invention, the adhesive is applied to the teeth part of the split core to form an adhesive layer, the split core is inserted in a fixed die, molten resin is injected, and then a movable die is moved to form the insulator. A final thickness of the insulator is about 300 μm, for example. While the molten resin moves along the teeth part, the fluidity of a portion of the resin contacting the adhesive layer is decreased, thus causing a flow in a direction perpendicular to a direction along the teeth part, namely, in a direction perpendicular to each side surface of the teeth part. Furthermore, when one end of each fibrous filler such as fibrous inorganic reinforcing material or the like mixed in the resin comes into contact with the adhesive layer, the fibrous filler is given a rotation force.

By the flow caused in the direction perpendicular to each side surface of the teeth part and the rotation force given to the fibrous fillers, the fibrous fillers are rotated or turned in the direction perpendicular to each side surface of the teeth part. When the resin is hardened from this state, the fibrous fillers are oriented in random directions inside the insulator.

In a conventional case where resin is molded for insulator without an adhesive layer, the resin will flow along each side surface of a teeth part and thus all of fibrous fillers are oriented along each side surface of the teeth part.

In contrast to above, when resin is molded for insulator with the adhesive layer being formed, the fibrous fillers can be oriented in random directions. Accordingly, thermal conductivity in the direction perpendicular to each side surface of the teeth part can be increased.

For instance, PPS resin used for the resin material for insulator has a thermal conductivity of 0.2 W/m·K and fillers have a thermal conductivity of 30 W/m·K. Even if resin contains 50% of fillers, thermal conductivity of such filler-containing resin merely becomes 1 W/m·K.

In a case where epoxy resin is used for the adhesive, its thermal conductivity is 0.2 W/m·K equal to the PPS resin. If the adhesive layer is formed with a thickness of 30 the thermal conductivity between the coil and the split core decreases by just that much. In other words, the thermal conductivity between the coil and the split core becomes lower because the adhesive layer is formed of the adhesive having a thermal conductivity of 0.2 W/m·K instead of the filler-containing resin having a thermal conductivity of 1 W/m·K.

However, the fibrous fillers are oriented in random directions and hence the thermal conductivity of the resin containing fibrous fillers greatly increases by 20% to 30% as compared with the conventional insulator. Consequently, even in a motor for hybrid electric vehicle, the heat generated in the coil can be thermally conducted to the stator core through the insulator efficiently.

BRIEF DESCRIPTION OF DRAWINGS

FIG. 9 is a schematic diagram showing a flow of an insulator material in the conventional example;

FIG. 10 is a graph showing data concerning thermal conductivity; and

DESCRIPTION OF EMBODIMENTS

A detailed description of preferred embodiments of a split stator and a split stator manufacturing method embodying the present invention will now be given referring to the accompanying drawings.

Figure 1:
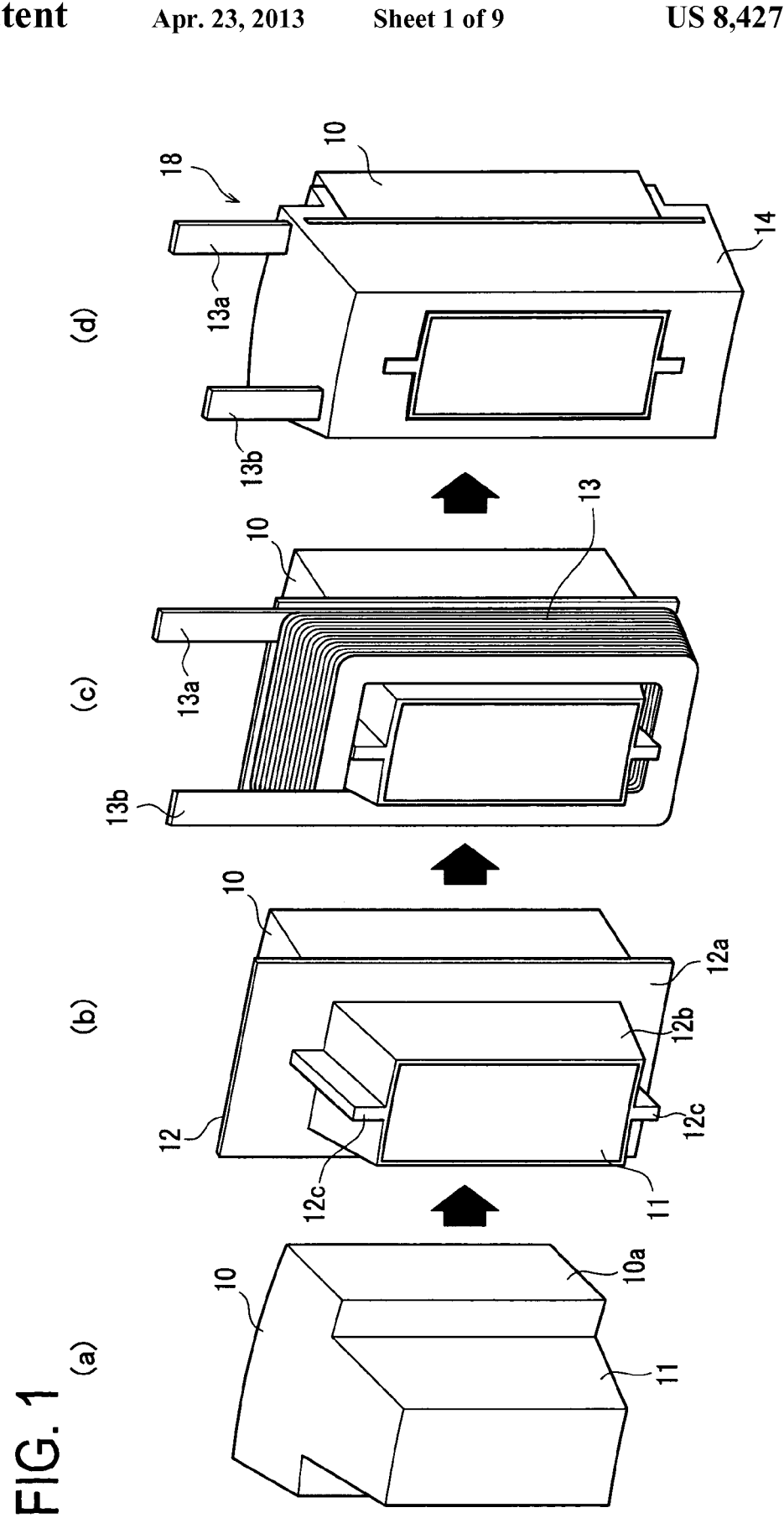
FIG. 1 is a view showing a sequence of manufacturing a split stator in an embodiment of the present invention.

FIG. 1 shows a sequence of manufacturing a split stator. A split stator core (hereinafter, referred to as a "split core") 10 includes an arc-shaped yoke part 10a and a teeth part 11 on which a coil is to be mounted. The split core 10 is made by laminating steel sheets produced by press-punching. Herein, eighteen split cores 10 are to be assembled together to form an annular stator core. This split core 10 is shown in a state (a) of FIG. 1. In a state (b) of FIG. 1, an insulator 12 is provided on the outer periphery of the teeth part 11 of the split core 10. The insulator 12 includes a sleeve part 12b which covers the teeth part 11, a flange 12a which covers an inner surface of the yoke part 10a other than the teeth part 11 and vertically extends larger than the yoke part 10a, and two ribs 12c protruding upward and downward from the sleeve part 12b. In particular, the thickness of each side wall of the insulator 12 is 0.2 mm to 0.3 mm in the embodiment.

A state (c) of FIG. 1 shows that a formed edgewise coil 13 is mounted on the teeth part 11 through the sleeve part 12b of the insulator 12. The edgewise coil 13 is made of a coil wire having a flat rectangular cross section and being wound with an inner diameter corresponding to the shape of the teeth part 11.

The edgewise coil 13 is placed in close contact with the split core 10 through the flange 12a. The edgewise coil 13 is positioned in place in a lateral direction by the teeth part 11 through the sleeve part 12b and in a vertical direction by the ribs 12c of the insulator 12. Accordingly, the edgewise coil 13 is held in a fixed position relative to the split core 10. The edgewise coil 13 includes a long end 13a extending upward from a position close to the flange 12a and a long end 13b extending upward from a position close to a front end face of the teeth part 11.

In the present embodiment, the edgewise coil 13 is used as a completely formed coil. However, another type of coil constituted of a wire having for example a circular cross section or a rectangular cross section may be adopted if only it has a completed shape.

Figure 3:
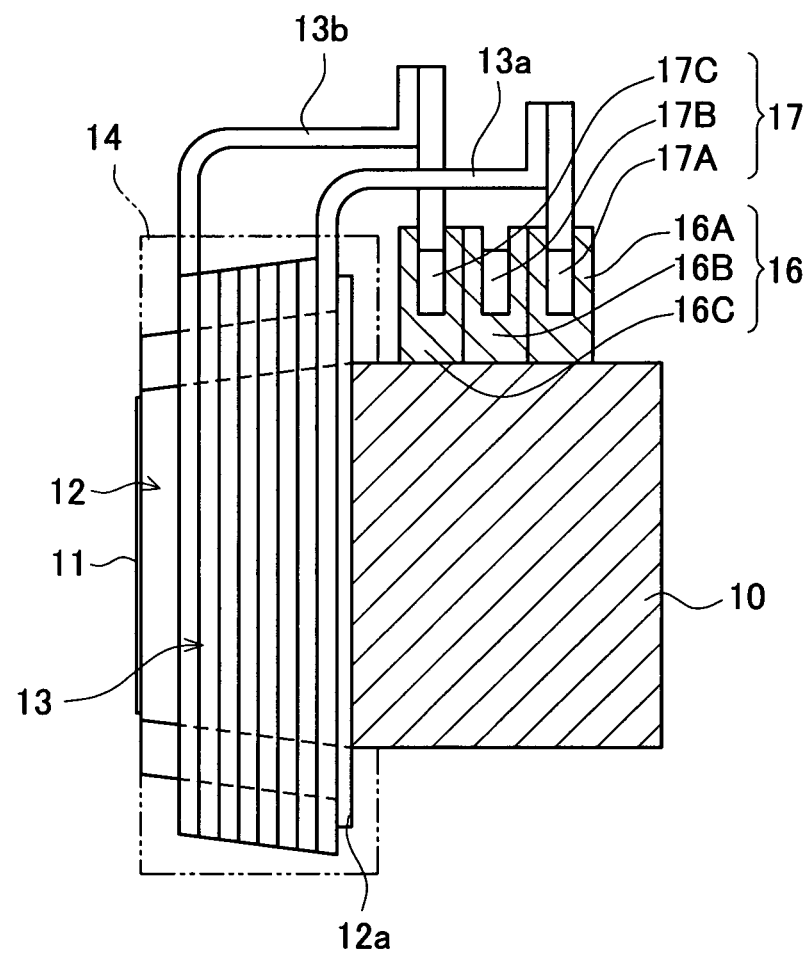
FIG. 3 is a sectional view of the split stator.

A state (d) of FIG. 1 shows a split stator 18 molded with resin. In this figure, the edgewise coil 13 shown in the state (c) is coated with a resin molded portion (layer) 14. A resin molding technique thereof will be mentioned in detail later. The pair of long ends 13a and 13b protrudes out of the resin molded portion 14 of the split stator 18. FIG. 3 is a sectional view of the resin-molded split stator 18, showing a positional relationship between the edgewise coil 13 and the resin molded portion 14.

The edgewise coil 13 is mounted on the split core 10 so that the insulator 12 is interposed therebetween, and then the resin molded portion 14 is formed to coat only a winding portion of the edgewise coil 13. FIG. 3 shows a state where a bus bar holder 16 (16A, 16B, 16C) made of resin for holding a bus bar 17 (17A, 17B, 17C) is fixed on the split core 10. To this bus bar 17, the long end 13a or 13b is connected in bent form.

Figure 2:
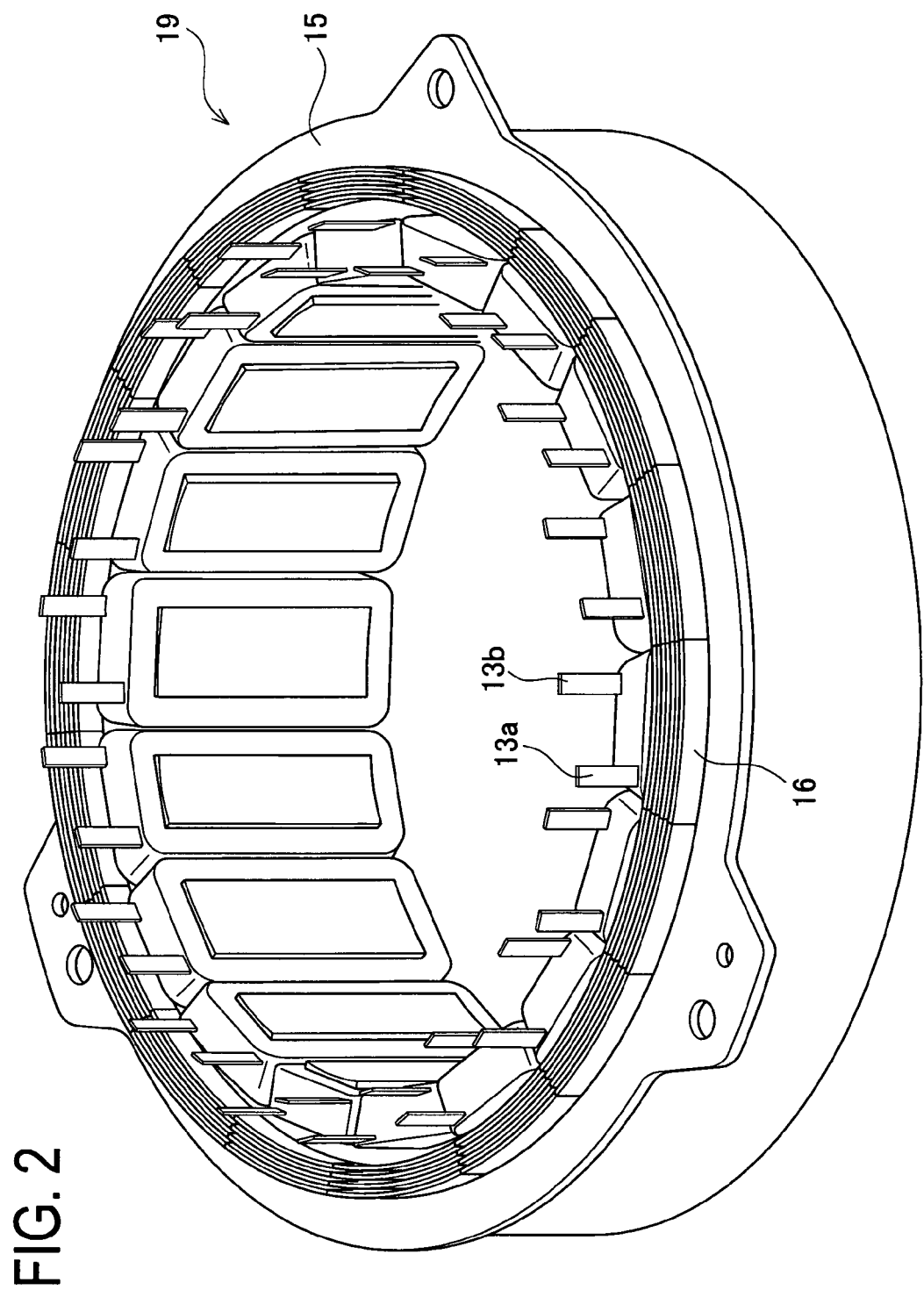
FIG. 2 is a view showing a stator constituted of eighteen split stators and fitted in an outer ring by shrink fitting.

FIG. 2 shows a stator 19 in which the eighteen split stators 18 are assembled together. The eighteen split stators 18 are assembled in annular form, and an outer ring 15 heated and expanded in inner diameter is set around the split stators 18. Then, this assembly is cooled to a normal temperature, causing the outer ring 15 to shrink, decreasing its inner diameter. The eighteen split stators 18 are then constricted integrally to form the stator 19. This technique is a so-called shrink fitting of an outer ring.

In a next step, not shown, the long end 13a of one split stator 18 is connected with the long end 13b of a third split stator 18 by skipping two split stators 18 to the left by means of the bus bars 17 in the holders 16. The long ends 13a and 13b of the eighteen split stators 18 are appropriately connected in this way through the bus bars 17 in the holders 16 to constitute a motor coil with three U, V, and W phases.

Figure 4:
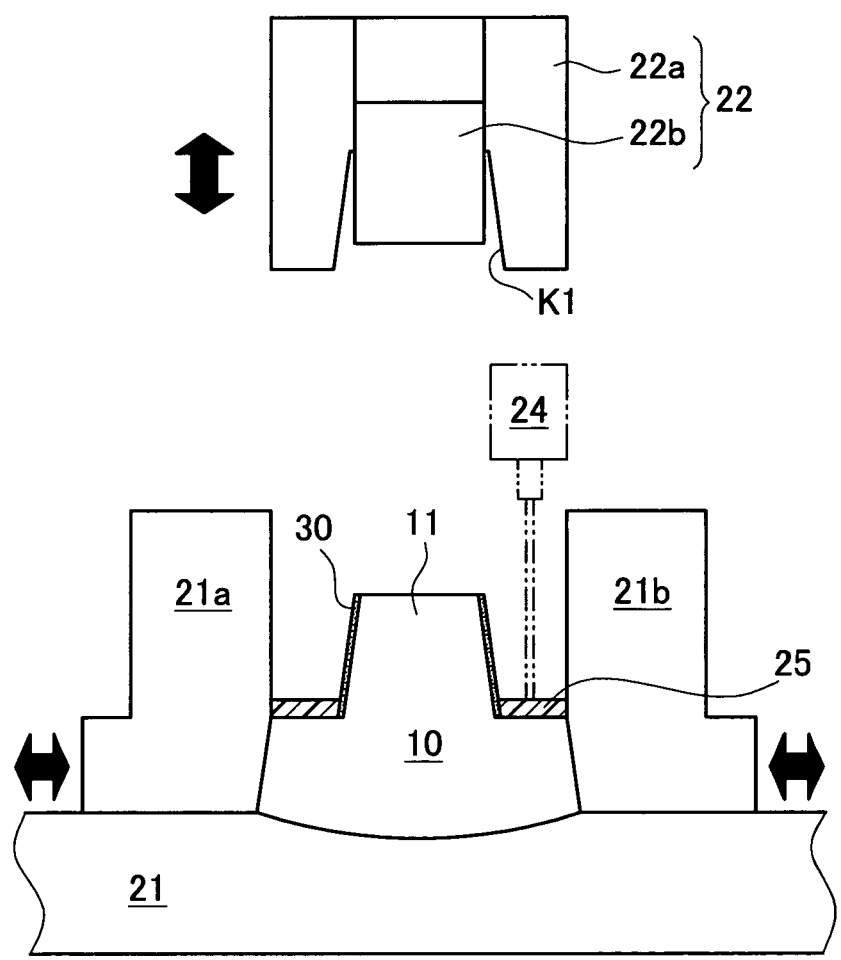
FIG. 4 is a view showing a structure of a molding die for forming an insulator.

A method of manufacturing the split stator 18 according to the present embodiment will be explained below. FIG. 4 shows a structure of a molding die for forming the insulator 12. This figure is a sectional view but it is not applied with hatching lines for easy viewing.

As shown in FIG. 4, the split core 10 is held by a lower die 21 in four side directions (only two of them are illustrated in the figure), using an appropriate slide core selected from various slide cores configured to hold a workpiece in two, three, or four sides directions. In this figure, specifically, the core 10 is fixedly held between a pair of lower slide cores 21a and 21b.

On an outer periphery, i.e., side surfaces, of the teeth part 11 of the split core 10, an adhesive layer 30 is formed. An adhesive used in this embodiment is water-based primer of epoxy resin. The thickness of the adhesive layer is 30 μm or less. The thermal conductivity of the adhesive is 0.1 to 0.2 W/m·K. From this state, the upper die 22 is moved downward. The upper die 22 includes a guide core 22a and a slide core 22b which is guided by the guide core 22a to vertically slide. A supply device 24 is disposed between the upper die 22 and the lower die 21 so as to be movable to a standby position.

An insulator forming process is explained below.

(1) In a state where the slide cores 21a and 21b of the lower die 21 are opened by moving apart from each other, the split core 10 applied with the adhesive layer 30 is loaded therebetween. The slide cores 21a and 21b are then closed by moving toward each other to hold the split core 10 in place from either side thereof. This split core 10 has been heated in advance until the temperature of the adhesive layer 30 reaches about 150° C.

(2) The upper die 22 stays in an open position and the supply device 24 is moved once around the teeth part 11 to supply a required amount of a material 25 for insulator such as PPS resin containing fillers into a cavity K1. FIG. 4 shows a state after the insulator material 25 is supplied. After completion of resin supply, the supply device 24 is moved to its standby position.

PPS resin is superior in heat resistance and chemical resistance to liquid crystalline polyester resin (LCP resin). In this embodiment, accordingly, PPS is used. The fillers may be selected from various fillers each having a nonspherical shape, for example, fibrous fillers such as glass fibers and plate-like fillers such as whiskers and talc. A rate of content of the fillers in this embodiment is determined in a range of 10 wt % to 70 wt %.

(3) The upper die 22 is then moved downward until the slide core 22b comes into contact with the front end face of the teeth part 11. In this state, the split stator 10, the lower slide cores 21a and 21b, the guide core 22a, and the slide core 22b define a cavity K1.

(4) Subsequently, the guide core 22a is further moved downward, providing a cavity K in a final shape for forming the insulator 12. Thus, the insulator material 25 is molded into the shape of the insulator 12 as shown in FIG. 1(b).

(5) After the insulator material 25 is hardened, the upper die 22 is moved upward.

Figure 8:
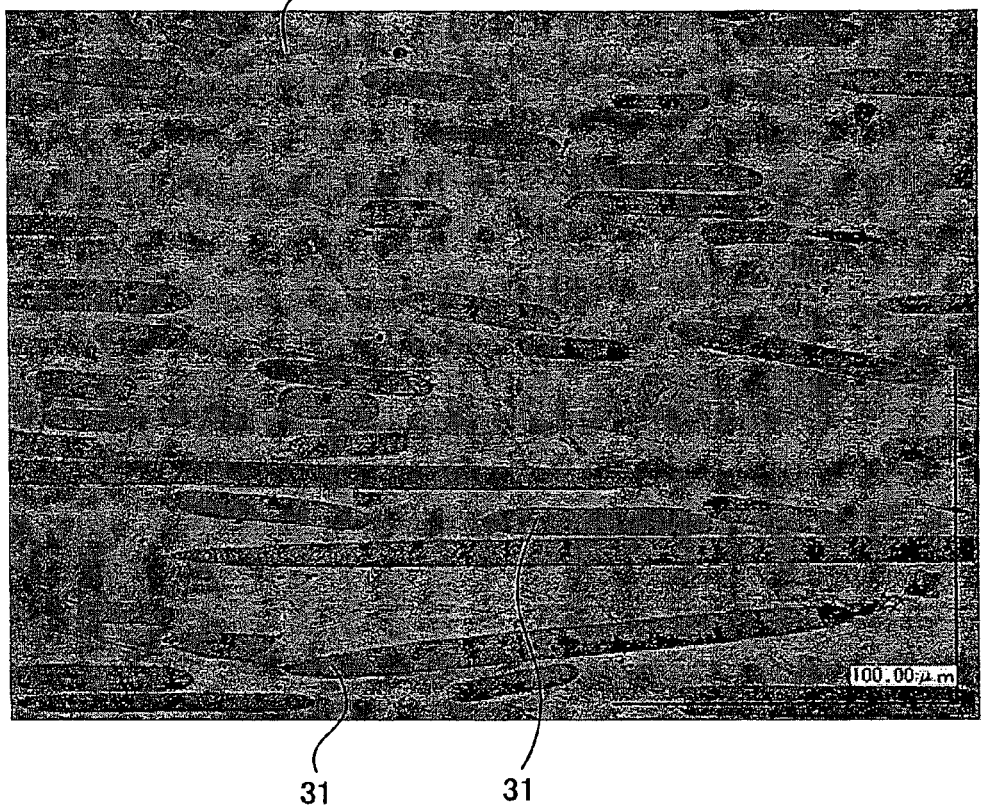
FIG. 8 is a view based on a microphotograph of a cross section of an insulator formed in a conventional example.

Herein, explanation is given to a flowing manner of the insulator material 25 which is filler-containing resin. FIG. 8 is a view showing a result of a conventional example where no adhesive layer is provided. Specifically, FIG. 8 shows a view created from a microphotograph showing a cut plane of the molded insulator 12 taken by an Ultra-deep color 3D profile measurement microscope (by KEYENCE Corporation, Model type VK-9500). The resin is PPS resin. The photographing conditions were 23° C., normal pressures, and 500– magnification. The resin 32 contains a number of fibrous fillers 31 in scattered manner. In the view, an upper side corresponds to a portion closer to the surface of the insulator 12 contacting the side surface of the teeth part 11 and a lower side corresponds to a portion closer to the surface of the insulator 12 contacting the inner surface of the guide core 22a of the upper die 22. The insulator material 25 flows from a left side to a right side. The vertical length of the view is about 200 μm. The distance from the inner surface of the guide core 22a to the surface of the teeth part 11 is about 300 μm. The view corresponds to a photograph obtained by photographing a center area of the insulator 12 between the inner surface of the guide core 22a and the surface of the teeth part 11.

It is found from FIG. 8 that almost all the fibrous fillers 31 are arranged in nearly parallel with the upper side. In other words, as shown in FIG. 9, any portions of the insulator material 25 flow in parallel from the left side to the right side as shown by arrows A. Accordingly, the fibrous fillers in the flow tend to be oriented so as to provide minimum resistance to the flow.

Next, the flow of the insulator material 25 made of filler-containing resin in the present embodiment is explained below.

Figure 5:
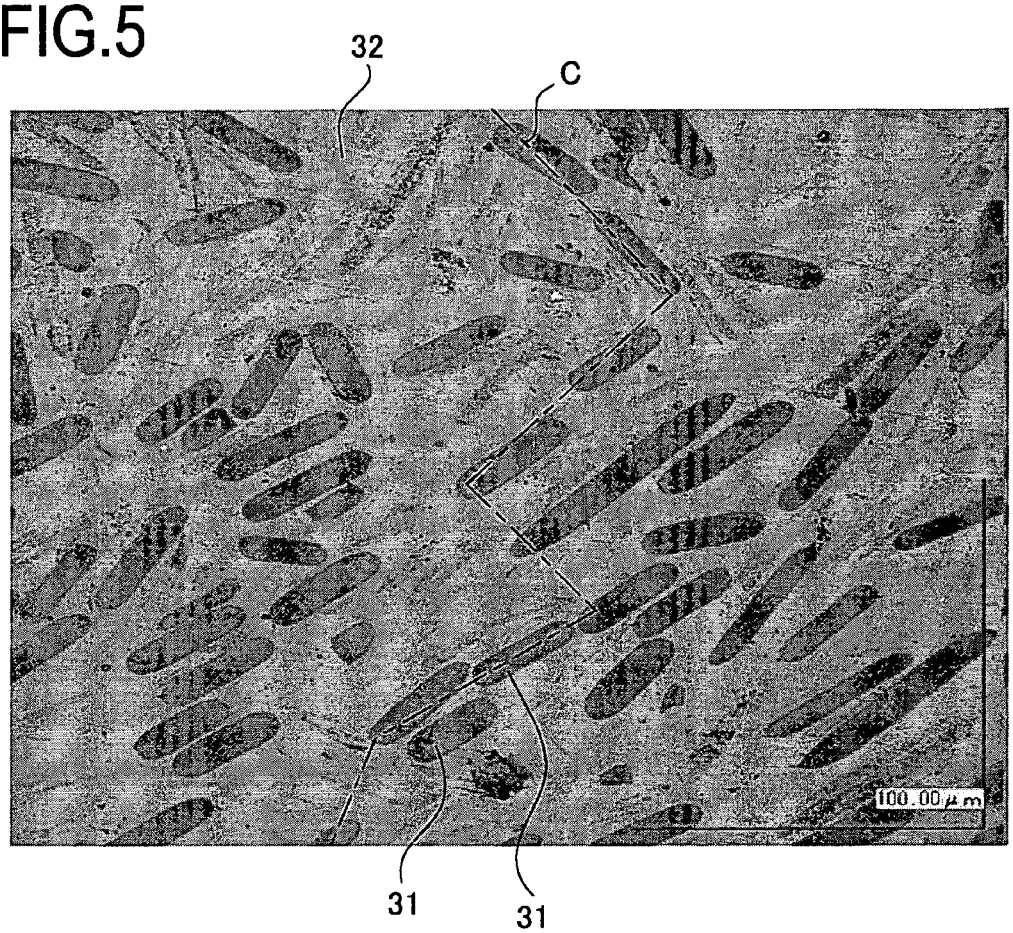
FIG. 5 is a view based on a microphotograph of a cross section of the insulator formed in the embodiment.

FIG. 5 shows a result in this embodiment. Specifically, FIG. 5 shows a view created from a microphotograph showing a cut plane of the molded insulator 12 taken by an Ultra-deep color 3D profile measurement microscope (by KEYENCE Corporation, Model type VK-9500). The resin is PPS resin. The photographing conditions were 23° C., normal pressures, and 500– magnification. The resin 32 contains a number of fibrous fillers 31 in scattered manner. In the view, an upper side corresponds to a portion closer to the surface of the insulator 12 contacting the side surface of the teeth part 11 through the adhesive layer 30 and a lower side corresponds to a portion closer to the surface of the insulator 12 contacting the inner surface of the guide core 22a of the upper die 22. The insulator material 25 flows from a left side to a right side. The vertical length of the view is about 200μm. The distance from the inner surface of the guide core 22a to the surface of the teeth part 11 is about 300 μm. The view corresponds to a photograph obtained by photographing a center area of the insulator 12 between the inner surface of the guide core 22a and the surface of the teeth part 11. It is found from FIG. 5 that almost all the fibrous fillers 31 are oriented in random directions.

Figure 6:
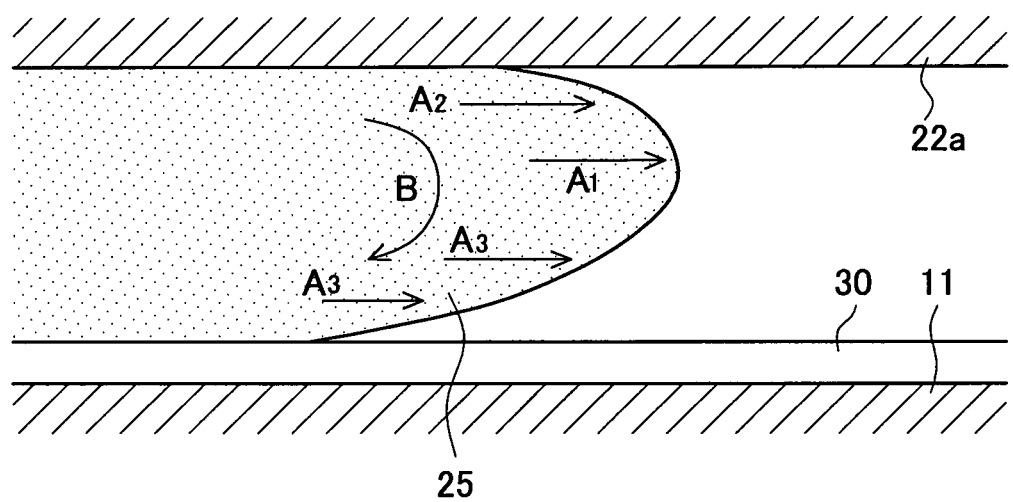
FIG. 6 is a schematic diagram showing a flow of an insulator material in the embodiment.

The reason of the above random filler orientation is explained. As shown in FIG. 6, flows A3 of the insulator material 25 along the adhesive layer 30 are very slower in the vicinity of the adhesive layer 30 than a flow A2 along the guide core 22a. Such unevenness in flow velocity will cause a transverse flow from the fast flow A2 to the slow flow A3 as indicated by an arrow B in FIG. 6. It is thus conceivable that the fibrous fillers 31 are caused to rotate by a transverse force to the flow, resulting in random orientations of the fibrous fillers 31.

Figure 7:
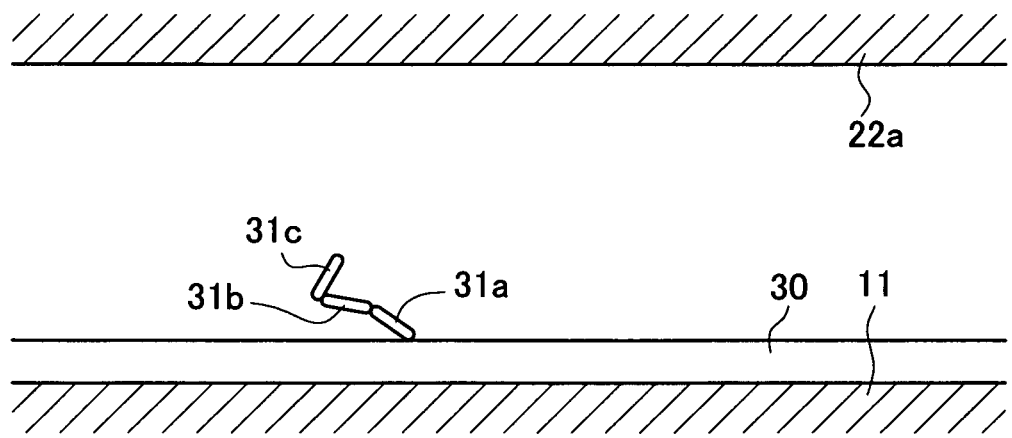
FIG. 7 is another schematic diagram showing the flow of the insulator material in the embodiment.

As shown in FIG. 7, furthermore, a fibrous filler 31a whose end collides with the adhesive layer 30 is rotated about the colliding end. It is therefore conceivable that fibrous fillers 31b and 31c and others flowing following the filler 31a collide in chain or pileup manner and change respective orientations randomly.

Herein, the split core 10 is heated in advance until the temperature of the adhesive layer 30 reaches about 150° C. Accordingly, the adhesive becomes active and thus provides enhanced adhesive strength, thereby inducing further change in the orientations of the fibrous fillers 31.

In FIG. 5, a thermal path C indicated by a dashed line provided by some of the fillers 31 from the upper side in the figure, i.e. the portion of the insulator 12 closer to the surface contacting the teeth part 11 of the split core 10, to the lower side, i.e. the portion of the insulator 12 closer to the surface contacting the guide core 22a (the edgewise coil 13). In the case where the thermal conductivity of the fibrous fillers 31 is 30 W/m·K, it is 150 times larger than the thermal conductivity of PPS resin 32 that is 0.2 W/m·K. It is therefore conceivable that the thermal path provided by the fibrous fillers 31 increases the entire thermal conductivity.

An actual measurement result is shown as a graph in FIG. 10. In this graph, a vertical axis represents the thermal conductivity of the insulator 12, and a bar "L" indicates the thermal conductivity of the insulator 12 having the structure shown in FIG. 8 in the conventional example. This thermal conductivity is assumed to be "100" in the graph.

A bar "M" indicates the thermal conductivity of the insulator 12 having the structure shown in FIG. 5 in the present embodiment. This thermal conductivity is higher by about 20% to 30% than the thermal conductivity L.

Figure 11:
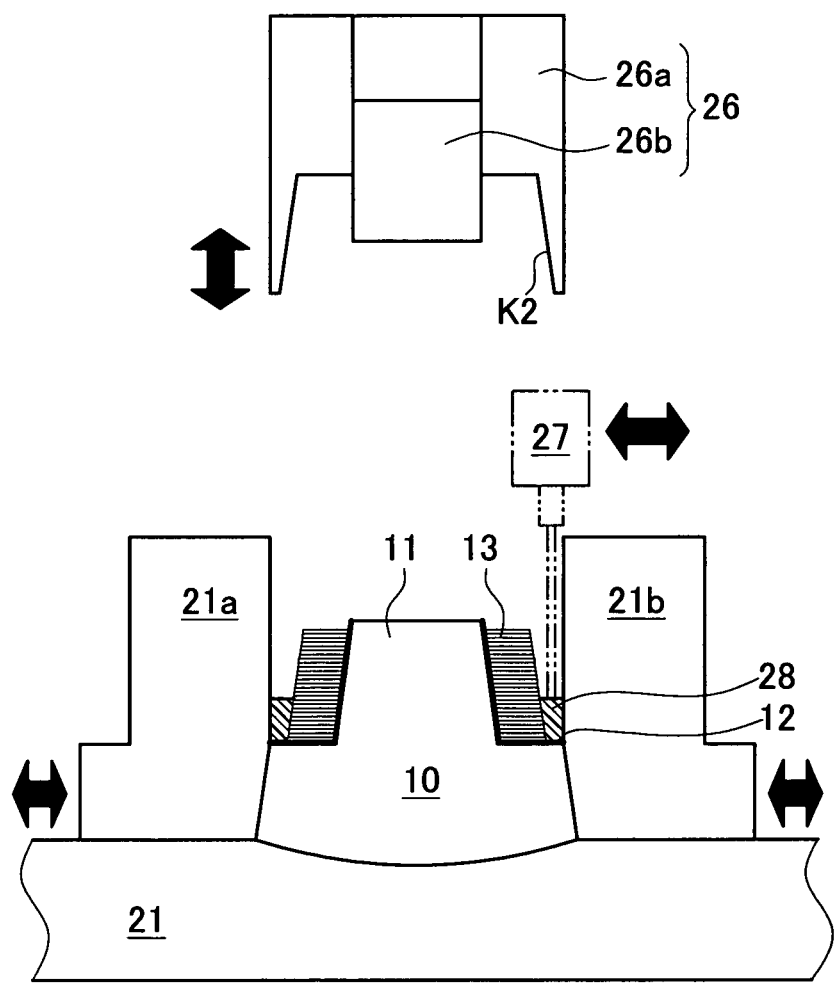
FIG. 11 is a view showing a structure of a molding die for forming a resin molded portion.

A molding die for forming the resin molded portion 14 is explained below. As shown in FIG. 11, the structures of the lower die 21 and the slide cores 21a and 21b are identical to those in FIG. 4. The structure of the guide core 26a of the upper die 26 is also identical to the guide core 22a of the upper die 22 in FIG. 4. A different structure from FIG. 4 is in the configuration of a lower surface of the slide core 26b for forming a cavity K2. The slide core 26b is guided by the guide core 26a to vertically slide. A supply device 27 is disposed between the lower die 21 and the upper die 26 so as to be movable to a standby position.

In a resin molding process, molding is performed after the edgewise coil 13 is set on the split core 10 in the cavity K2.

Accordingly, the long ends 13a and 13b of the edgewise coil 13 have to be shielded in an appropriate manner.

The details of the resin molding process is explained below.

(1) In a state where the slide cores 21a and 21b of the lower die 21 are opened by moving apart from each other, the split core 10 with the molded insulator 12 is loaded therebetween. The slide cores 21a and 21b are then closed by moving toward each other to hold the split core 10 from either side thereof. The split core 10 has been heated in advance. The formed edgewise coil 13 is then inserted in the lower die 21 so as to be set on the core 10.

(2) The upper die 26 stays in an open position and the supply device 27 is moved once around the teeth part 11 (the coil 13) to supply a required amount of a resin molding material 28 forming the resin molded portion 14 into the cavity K2. FIG. 11 shows a state where the resin molding material 28 has been supplied. After completion of resin supply, the supply device 27 is moved to its standby position.

(3) The upper die 26 is moved downward until the slide core 26b comes into contact with the front end face of the teeth part 11. In this state, the split stator core 10, the lower slide cores 21a and 21b, the guide core 26a, and the slide core 26b define the cavity K2.

(4) Subsequently, the guide core 26a of the upper die 26 is further moved downward, forming the cavity K2 in a final shape for forming the resin molded portion 14. The cavity K2 includes the edgewise coil 13 and is larger than the cavity K1. In this way, the resin molding material 28 is supplied in the cavity K2 and molded into the shape of the resin molded portion 14 as shown in FIG. 1 (d).

(5) After the resin molding material 28 is hardened and then the upper die 26 is moved upward.

As the details are explained above, according to the split stator 18 in the present embodiment, the adhesive is applied on the side surfaces of the teeth part 11 of the split core 10 to form the adhesive layer 30, the split core 10 is inserted in the lower die 21, the molten insulator material 25 is injected, and then the upper die 22 is moved downward to form the insulator 12. The final thickness of the insulator 12 is about 200 μm to 300 μm. When the molten resin flows along each side surface of the teeth part 11, the fluidity of the resin contacting the adhesive layer 30 is decreased. Thus, a flow of resin is caused in a direction perpendicular to a direction parallel to each side surface of the teeth part 11, namely, in a direction perpendicular to each side surface of the teeth part 11. Furthermore, one ends of some of the fibrous fillers 31 such as fibrous inorganic reinforcing materials or the like mixed in the insulator material 25 may contact or collide with the adhesive layer 30, thereby giving a rotation force to the fibrous fillers 31.

By the flow caused in the direction perpendicular to each side surface of the teeth part 11 and the rotation force given to some of the fibrous fillers 31, such fibrous fillers 31 are caused to rotate in the direction perpendicular to each side surface of the teeth part 11. In this state, the insulator material 25 is hardened and thus the fibrous fillers 31 are oriented randomly in the formed insulator 12.

Herein, the split core 10 has been heated in advance until the temperature of the adhesive layer 30 reaches about 150° C. Accordingly, the adhesive becomes active and thus provides enhanced adhesive strength, thereby inducing further change in the orientations of the fibrous fillers 31. Thus, the thermal conductivity of the insulator 12 can be more increased.

In the conventional case where the insulator material 25 is molded without the adhesive layer 30, the insulator material 25 tends to flow along each side surface of the teeth part 11. Accordingly, all of the fibrous fillers 31 are oriented in parallel with each side surface of the teeth part 11 as shown in FIG. 8.

On the other hand, in the presence of the adhesive layer 30, the fibrous fillers 31 are oriented in random directions as shown in FIG. 5. Thus, the thermal conductivity, in the direction perpendicular to each surface of the teeth part 11 between the split core 10 and the edgewise coil 13 can be increased.

For instance, the thermal conductivity of PPS resin is 0.2 W/m·K and the thermal conductivity of the fibrous fillers 31 is 30 W/m·K. Even when the insulator material 25 contains 50% of the fibrous fillers 31, the thermal conductivity of the filler-containing resin is merely 1 W/m·K.

In the case where epoxy resin is used for the adhesive, its thermal conductivity is 0.2 W/m·K equal to that of PPS resin. If the adhesive layer 30 is formed with a thickness of 30 μm, for instance, the thermal conductivity between the split core 10 and the edgewise coil 13 decreases by just that much. In other words, the thermal conductivity between the split core 10 and the edgewise coil 13 (the entire thermal conductivity of the insulator 12 and the adhesive layer 30) becomes lower because the adhesive layer 30 is formed of the adhesive having a thermal conductivity 0.2 W/m·K instead of the filler-containing resin having a thermal conductivity of 1 W/m·K.

However, since the fibrous fillers 31 are oriented in random directions, the thermal path is formed as shown in FIG. 5. Accordingly, the thermal conductivity of the resin containing fibrous fillers greatly increases. The thermal conductivity of the entire insulator 12 becomes higher by 20% to 30% than the conventional insulator 12, as shown in FIG. 10. Even in a motor for hybrid electric vehicle, therefore, the heat generated in a coil can be thermally conducted to each split core 10 efficiently through each insulator 12.

In the present embodiment, the thickness of the adhesive layer 30 is 30 μm. As an alternative, the adhesive layer 30 may be formed to be thinner if only it can have a uniform thickness. Such thinner thickness allows entirely increased thermal conductivity (between the split core 10 and the edgewise coil 13).

The present invention is not limited to the above embodiment(s) and may be embodied in other specific forms without departing from the essential characteristics thereof.

For instance, in the above embodiment, the water-based primer of epoxy resin is used. Alternatively, any other adhesives may be used if only having viscosity enough to decrease the fluidity of PPS resin and to cause the ends of the fibrous fillers 31 to stick to the adhesive layer 30 so that a rotation force is given to the fibrous fillers 31.

In the above embodiment, PPS resin which is thermoplastic resin is used for the insulator material 25. The present invention may also be applied to injection molding using thermosetting resin.

Although the above embodiment exemplifies the use of the fibrous fillers 31, the use of plate-like fillers can provide the same advantages as above.

Although the above embodiment exemplifies the use of the fibrous fillers 31, any other types of fillers such as fillers having a rod shape and fillers having an oblong cross section may be adopted.

The aforementioned split core 10 has a single edgewise coil 13. Alternatively, a split core having two teeth part 11 and two edgewise coils 13 each of which is mounted on each teeth part 11 may be entirely molded (coated) with resin. Another split core having three teeth part 11 and three edgewise coils 13 each of which is mounted on each teeth part 11 may be entirely molded with resin.

As mentioned in the above embodiment, the edgewise coil may be made of a wire having a circular cross section, a square cross section, or another shape. The coil has only to have a completely formed shape.

The invention claimed is:

1. A split stator member comprising:
    a split core member having a teeth part; and
    an insulator formed on an outer periphery of the teeth part with an adhesive layer being interposed therebetween,
    the insulator being formed of a resin material by resin molding directly around the adhesive layer on the outer periphery of the teeth part,
    the resin material is a resin containing a filler having a non-spherical shape, and
    the non-spherical filler is oriented in a random direction in the resin-molded insulator.

2. The split stator member according to claim 1, wherein the non-spherical filler has higher thermal conductivity than thermal conductivity of the resin material.

3. The split stator member according to claim 1, wherein the non-spherical filler has one of a fibrous shape, a plate-like shape, a rod-like shape, and an oblong-cross-sectional shape.

4. A method of manufacturing a split stator member including a split core member, comprising the steps of:
    applying an adhesive on an outer periphery of the teeth part to form an adhesive layer;
    inserting the split core member in a die; and
    forming an insulator of a resin material by resin molding directly around the adhesive layer,
    the resin material is a resin containing a filler having a non-spherical shape, and
    the non-spherical filler is oriented in a random direction in the resin-molded insulator.

5. The method of manufacturing a split stator member according to claim 4, wherein the non-spherical filler has higher thermal conductivity than thermal conductivity of the resin material.

6. The method of manufacturing a split stator member according to claim 4, wherein the non-spherical filler has one of a fibrous shape, a plate-like shape, a rod-like shape, and an oblong-cross-sectional shape.

7. The method of manufacturing a split stator member according to claim 4, wherein the adhesive is heated in advance before the insulator is formed.

8. The split stator member according to claim 1,
    wherein an adhesive forming the adhesive layer has viscosity enough to cause an end of the filler to stick to the adhesive layer so that a rotation force is given to the filler when the insulator is molded of the resin material.

9. A stator comprising a plurality of the split stator members according to claim 1.

10. The method of manufacturing a split stator member according to claim 4,
    wherein an adhesive forming the adhesive layer has viscosity enough to cause an end of the filler to stick to the adhesive layer so that a rotation force is given to the filler when the insulator is molded of the resin material.

* * * * *